Aug. 5, 1958 W. F. FESSLER 2,845,770
BALED HAY RACK AND CARRIER
Filed Sept. 26, 1956 2 Sheets-Sheet 2
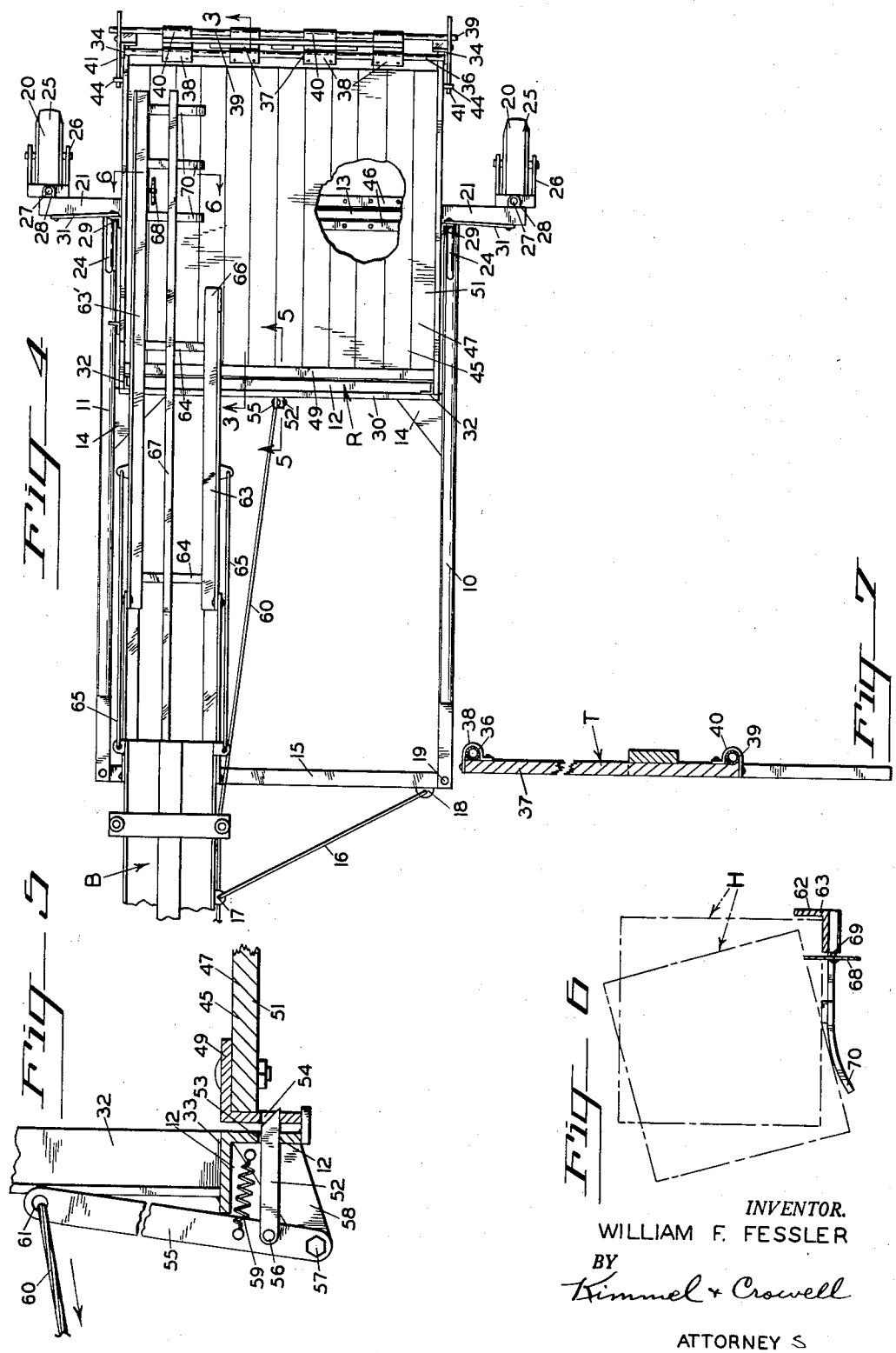
INVENTOR.
WILLIAM F. FESSLER
BY
Kimmel & Crowell
ATTORNEYS

United States Patent Office 2,845,770
Patented Aug. 5, 1958

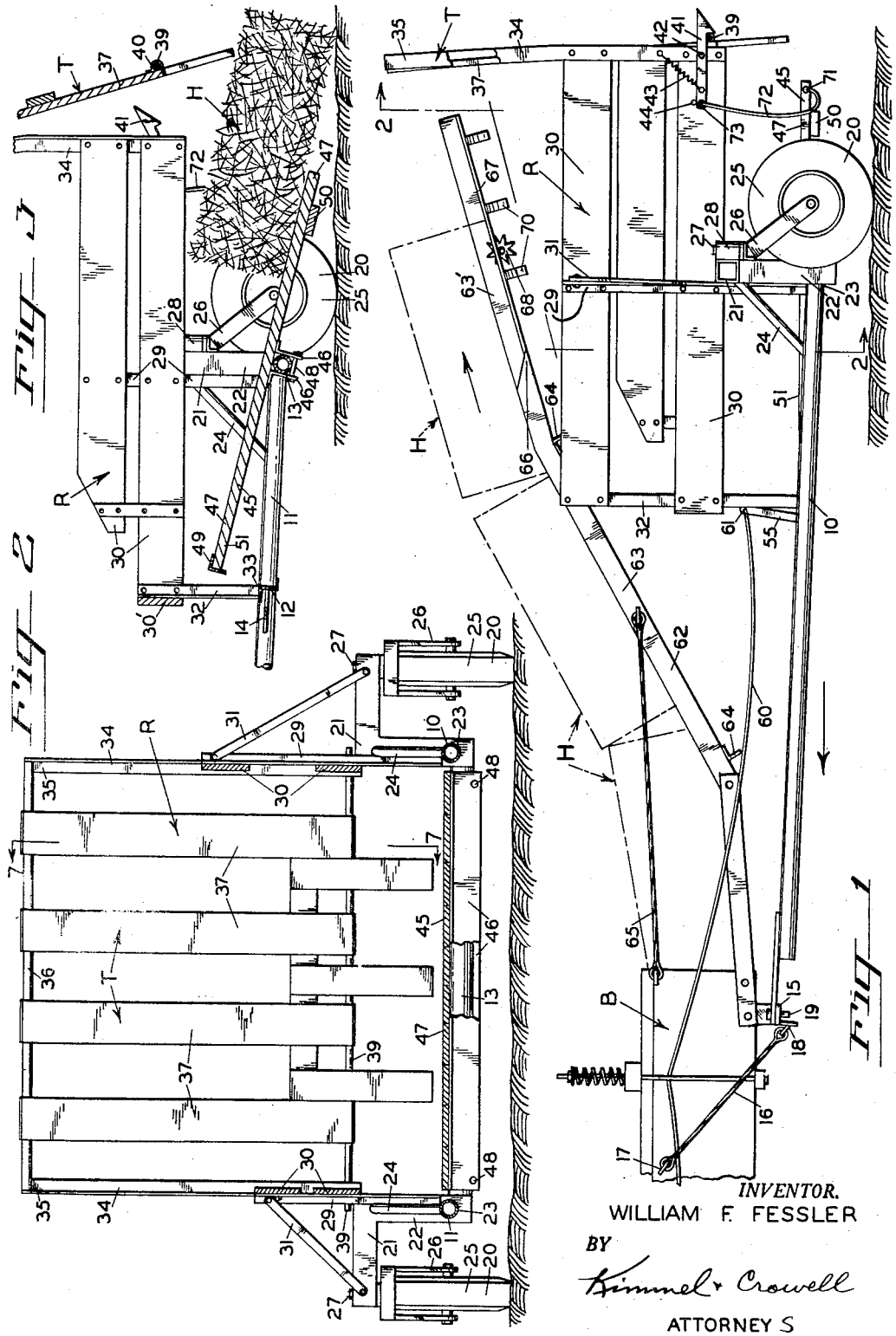

2,845,770

BALED HAY RACK AND CARRIER

William F. Fessler, Mount Angel, Oreg.

Application September 26, 1956, Serial No. 612,258

3 Claims. (Cl. 56—473.5)

The present invention relates to a baled hay rack and carrier to be towed behind hay balers and receive baled hay therefrom.

The primary object of the invention is to provide a rack and carrier to be towed by hay balers for receiving the bales of hay from the baler, carrying the same to a predetermined destination where they are released from the rack to be picked up by trucks.

A further object of this invention is to provide a rack for carrying hay bales discharged from hay balers wherein the operator of the baler can release the accumulated bales at a predetermined location.

Another object of the invention is to provide means associated with the rack and carrier for resetting automatically for another load of hay bales.

Other objects and advantages will become apparent in the following specification when considered in the light of the attached drawings, in which:

Figure 1 is a side elevation of the invention shown connected to the rear of a hay baler, with the baler broken away.

Figure 2 is a transverse sectional view, taken on the line 2—2 of Figure 1, looking in the direction indicated, with parts broken away for convenience of illustration.

Figure 3 is a fragmentary longitudinal section taken on the line 3—3 of Figure 4, looking in the direction incated, showing the discharge of baled hay therefrom.

Figure 4 is a top plan view of the rack and carrier, shown attached to the rear end of the hay baler, parts broken away for convenience of illustration.

Figure 5 is an enlarged fragmentary longitudinal cross-section taken on the line 5—5 of Figure 4, looking in the direction indicated.

Figure 6 is an enlarged fragmentary transverse cross-section taken on the line 6—6 of Figure 4, looking in the direction indicated.

Figure 7 is a fragmentary vertical cross-section taken on the line 7—7 of Figure 2, looking in the direction indicated.

Referring now to the drawings in detail wherein like reference characters indicate like parts throughout the several figures, the reference character B indicates generally a fragmentary portion of a baling chamber of a conventional mobile hay baler. The portion of the baling chamber B illustrated is the rear or discharge end of the baler.

My new and improved hay baler rack and carrier is illustrated generally by the letter R and consists of a pair of spaced parallelly disposed frames 10 and 11. The frames 10 and 11 are connected together by a transverse frame member 12 intermediate their ends, and a rear cross frame 13 at the rear end. Suitable gussets 14 are provided between the frames for maintaining the assembled framework in fixed alignment.

The forward ends of the side frames 10 and 11 are connected to a transverse draw bar 15, which is detachably connected to the baling chamber B by bolts or any other suitable means (not shown). The transverse draw bar 15 is braced by a bar 16, which is fixedly mounted to the baling chamber B at 17 and to the draw bar 15 at 18. The frame members 10 and 11 are detachably connected to the draw bar 15 by king pins 19.

The rear end of the frames 10 and 11 are supported upon caster wheels 20 carried by brackets 21. The vertically disposed portions 22 of the brackets 21 are fixedly secured at 23 to the end of the side frames 10 and 11, and to the end of the transverse frame 13, as best illustrated in Figure 2. The brackets are further braced by the bracing 24 to the side frames 10 and 11.

The caster wheels 20 are provided with tires 25 and are mounted within the forks 26. The forks 26 have a vertical king pin 27 forming part thereof and journalled within the vertical bearings 28 forming part of the brackets 21. By supporting the carrier R on caster wheels 20, the carrier R can be swung around with the hay baler while making turns.

The body of the rack consists of vertical posts 29, which are fixedly secured to the vertical portions 22 of the brackets 21 by any suitable means, such as welding (not shown). The posts 29 support side members 30 of the rack and are braced by braces 31, extending outwardly therefrom to the brackets 21, as seen in Figure 2.

Vertical posts 32 are fixedly mounted upon the cross member 12 at 33 and further support the rack side members 30 on their forward end of the carrier R, while the rear end of the side members 30 are connected together by vertical legs 34, which extend upwardly therealong at the rear of the carrier R at 35.

The vertical posts 34 at their upper ends support a transverse spacer bar or beam 36, which is fixedly secured thereto by welding (not shown) or other suitable means. The transverse bar 36 supports a tail gate assembly T, which consists of vertical slats 37 secured thereto by clamps 38, referring particularly to Figures 2, 4 and 7.

A second transverse bar or beam 39 is secured to the lower end of the slats 37 of the tail gate T by clamps 40, the bar 39 extending beyond the vertical posts 34 and resting thereagainst when the tail gate T is closed. Latches 41 are pivotally mounted at 42 to the bottom of the posts 34 and latch over the opposite ends respectively of the transverse bar 39, referring particularly to Figures 1 and 4. A spring 43 forces the latch 41 into engagement with the bar 39 and against a limit stop 44, except when the bales H are discharged from the carrier R, the operation of which will be later described.

The bottom 45 of the carrier R is pivotally supported by the transverse frame member 13, referring particularly to Figures 2, 3 and 4 by angle bars 46 engaged over opposite sides of the member 13 and which are fixedly secured to the underside of the planking 47. The planking 47 together with the angle bars 46 are held in the cross frame 13 by locking bolts 48. The forward end of the planks 47 are connected together by a transverse angle bar 49, while the rear of the planks 47 are connected together by a transverse member 50.

The forward end 51 of the bottom 45 is slightly heavier than the rear of the bottom 45 so that the weight of the same will position the bottom 45 in a horizontal plane when the bales H of hay are released therefrom. Referring to Figure 5, the bottom 45 is held in a level or carrying position by a locking bar 52 which passes through an opening 53 in the transverse frame 12 and into an opening 54 in the transverse frame 49 of the bottom 45.

The locking bar 52 is pivotally connected to a vertical lever 55 at 56. The vertical lever 55 is pivotally mounted at 57 to a bracket 58 forming part of the transverse frame member 12. A spring 59 normally maintains the locking bar 52 in the position shown in Figure 5.

A pull cord 60 is connected to the lever 55 at 61 and extends to the operator's position located on the hay baler where the operator can unlock the locking bar 52 from the bottom 45, discharging the hay bales H from the carrier R.

Fixedly secured to the rear of the baling chamber B is an inclined chute 62, consisting of side angles 63 and 63', connected together by suitable bracing 64. The chute 62 is further braced by guy wires 65 connected to the chute 62 and baling chamber B at their respective opposite ends. Referring particularly to Figure 4, it will be noted that the angle 63 stops at the point 66, while the angle 63' continues on rearwardly.

A flat bar or guide 67 is disposed intermediate the guides 63 and 63'. In order to maintain the bale of hay H in alignment until discharged from the chute 62, a star-wheel 68 is journalled to the outer end of the guideway 63' on a stub shaft 69. Extending transversely of the guide bar 67 are a plurality of downwardly curved fingers 70, referring particularly to Figure 6.

Connected to the bottom 45 at 71 are pull cords 72, having their upper ends connected to the latches 41 at 73. The pull cords 72 unlatch the tail gate T when it is desired to dump the baled hay H from the bottom, the operation of which will now be described.

As the hay is baled within the baling chamber B of the baler and discharged therefrom, as indicated by the broken lines representing the baled hay H, it forces the preceding bale H up the inclined chute 62. When the forward end of the bale H to be discharged on the bottom 45 of the carrier reaches the star-wheel 68, this star-wheel penetrates the bale H causing the bale H to go straight forward beyond the end 66 of the guideway 63 onto the fingers 70 until its rear end reaches the point 66, at which time the bale will tilt sidewise and downwardly over the surface of the fingers 70, referring particularly to Figure 6, and onto the bottom 45 of the carrier R slightly rearwardly of the transverse pivot frame member 13. The star-wheel 68 maintaining the bale H in straight aligned position until the bale H releases from the end of the guideways 63 at 66.

When the desired number of bales H are released onto the bottom 45 of the carrier R, the operator of the baler grasps the pull cord 60, pulling the same, which will release the locking bolt 52 from the hole 54 of the transverse bar 49 of the bottom 45. This will permit the forward end 51 of the bottom 45 to raise up due to the weight of the bales H beyond the center pivot cross bar 13.

When this happens the pull cords 72 unlatch the latches 41 from the transverse bar 39 of the tail gate T, allowing the gate T to swing open, as illustrated in Figure 3, discharging the bales of hay H onto the ground surface.

As the baler B moves forward, together with the baled hay carrier R, the forward end of the bottom 45 will be heavier than the rear end of the bottom 45, causing the same to return to its horizontal position where the locking bar 52 will re-engage the transverse bar 49 holding the bottom 45 in this position.

The pull cord 72 will be slackened off, allowing the springs 43 of the latches 41 to permit the latches 41 to engage the transverse tail gate bar 39, holding the tail gate T closed for receiving another load of baled hay H.

Having thus described the preferred embodiment of the invention, it should be understood that numerous structural modifications and adaptations may be resorted to without departing from the scope of the appended claims.

What is claimed is:

1. A baled hay carrier for use with a hay baler of the type having rearwardly discharging hay bales and means for guiding said bales into said carrier comprising, a frame adapted for attachment at its forward end to the rear end of said hay baler, wheels supporting the rear end of said frame, spaced parallel sides secured to said frame and extending upwardly therefrom, a tail gate having its upper end pivotally supported on the upper rear edges of said sides, a hook pivotally carried on each of said sides at the rear thereof for releasably securing the lower end of said tail gate to said sides, a bottom, transverse horizontal pivot means securing said bottom to said frame, said pivot means being secured to said bottom rearwardly of the center of gravity of said bottom, a latch bolt mounted on said frame forwardly of said bottom for releasably securing the forward end of said bottom to said frame, flexible means for moving said latch bolt to bottom releasing position, and flexible means extending from the rear portion of said bottom to said hooks whereby pivotal movement of said bottom away from said tail gate pivots said hooks and releases said tail gate for rearwardly swinging movement discharging hay bales supported on said bottom.

2. A device as claimed in claim 1 wherein the wheels supporting said frame comprise spaced apart caster wheels.

3. A device as claimed in claim 1 wherein brackets are provided on said framework for supporting said caster wheels at a point substantially above said framework.

References Cited in the file of this patent

UNITED STATES PATENTS

| | | |
|---|---|---|
| 2,520,458 | Doherty | Aug. 29, 1950 |
| 2,727,352 | Jones | Dec. 29, 1955 |